US011934526B2

(12) United States Patent
Polakovic

(10) Patent No.: US 11,934,526 B2
(45) Date of Patent: Mar. 19, 2024

(54) LATE STAGE DEVICE CONFIGURATION AND BEHAVIOR PATTERN-BASED VALIDATION

(71) Applicant: Schneider Electric USA, Inc., Andover, MA (US)

(72) Inventor: Juraj Polakovic, Eybens (FR)

(73) Assignee: Schneider Electric USA, Inc., Boston, MA (US)

( * ) Notice: Subject to any disclaimer, the term of this patent is extended or adjusted under 35 U.S.C. 154(b) by 505 days.

(21) Appl. No.: 17/259,879

(22) PCT Filed: Jul. 12, 2019

(86) PCT No.: PCT/US2019/041640
§ 371 (c)(1),
(2) Date: Jan. 12, 2021

(87) PCT Pub. No.: WO2020/014633
PCT Pub. Date: Jan. 16, 2020

(65) Prior Publication Data
US 2021/0303693 A1 Sep. 30, 2021

Related U.S. Application Data

(60) Provisional application No. 62/697,800, filed on Jul. 13, 2018.

(51) Int. Cl.
*G06F 21/57* (2013.01)
*G06F 8/61* (2018.01)
*G06F 8/65* (2018.01)
*G06F 9/50* (2006.01)
(Continued)

(52) U.S. Cl.
CPC ......... *G06F 21/572* (2013.01); *G06F 9/5072* (2013.01); *G06F 9/541* (2013.01);
(Continued)

(58) Field of Classification Search
CPC ...... G06F 21/572; G06F 9/5072; G06F 9/541; G06F 21/16; G06F 8/65; G06F 8/61; G06F 11/26; G06F 11/3668; H04L 41/08
(Continued)

(56) References Cited

U.S. PATENT DOCUMENTS 6,687,814 B1 * 2/2004 Duppong ............ G06F 13/4068
713/1
7,266,028 B1 * 9/2007 Ghosh Dastidar ..... G11C 29/44
365/201
(Continued)

FOREIGN PATENT DOCUMENTS

EP 3223485 A1 9/2017

OTHER PUBLICATIONS

International Search Report and Written Opinion dated Nov. 15, 2019 in PCT/US2019/041640, 14 pp.
(Continued)

*Primary Examiner* — Ji H Bae
(74) *Attorney, Agent, or Firm* — Locke Lord LLP

(57) ABSTRACT

Techniques for dynamically configuring a device for a cloud-based environment and validating the configuration are described. One embodiment includes receiving a configuration request for a device and processing the configuration request to determine one or more customization characteristics. The device is configured with the one or more customization characteristics to dynamically update the device. A software module is selected from a repository for the device based on the one or more customization characteristics and installed on the device. Embodiments perform a multi-part verification operation on the device, where the multi-part verification operation includes at least a multi-cloud verification operation and a runtime behavior analysis.

19 Claims, 12 Drawing Sheets

(51) Int. Cl.
    *G06F 9/54*     (2006.01)
    *G06F 11/26*     (2006.01)
    *G06F 11/36*     (2006.01)
    *G06F 21/16*     (2013.01)
    *H04L 41/08*     (2022.01)

(52) U.S. Cl.
    CPC ............... *G06F 21/16* (2013.01); *G06F 8/61* (2013.01); *G06F 8/65* (2013.01); *G06F 11/26* (2013.01); *G06F 11/3668* (2013.01); *H04L 41/08* (2013.01)

(58) Field of Classification Search
    USPC ............... 713/1, 100; 717/171, 176; 714/25; 709/217, 220
    See application file for complete search history.

(56) References Cited

U.S. PATENT DOCUMENTS

| | | | |
|---|---|---|---|
| 8,090,818 B2 | 1/2012 | Sindambiwe | |
| 8,578,017 B2 | 11/2013 | Cobb et al. | |
| 10,007,789 B2 | 6/2018 | Kim et al. | |
| 2007/0089108 A1 | 4/2007 | Chen et al. | |
| 2007/0294756 A1 | 12/2007 | Fetik | |
| 2009/0119678 A1 | 5/2009 | Shih et al. | |
| 2009/0320019 A1 | 12/2009 | Ellington et al. | |
| 2011/0153612 A1 | 6/2011 | Paul et al. | |
| 2013/0283262 A1 | 10/2013 | Rehtijarvi | |
| 2014/0108538 A1 | 4/2014 | Borzycki et al. | |
| 2014/0223432 A1 | 8/2014 | Halim et al. | |
| 2015/0271014 A1 | 9/2015 | Madama | |
| 2015/0339130 A1* | 11/2015 | Kruglick | G06F 11/3024 713/100 |
| 2016/0164954 A1 | 6/2016 | Mcwilliams et al. | |
| 2017/0279829 A1 | 9/2017 | Vasseur et al. | |
| 2018/0302495 A1* | 10/2018 | Lee | G06F 9/455 |

OTHER PUBLICATIONS

Extended European Search Report dated Feb. 10, 2022 for corresponding European Patent Application No. 19833832.9-1224, 16 pages.

* cited by examiner

Pre-Dynamic Customization

Post-Dynamic Customization

LATE STAGE DEVICE CONFIGURATION AND BEHAVIOR PATTERN-BASED VALIDATION

PRIORITY CLAIM

This application claims the benefit of U.S. Provisional Patent Application No. 62/697,800, filed on Jul. 13, 2018, and entitled "Systems and Methods Of Dynamic Late Stage Device Configuration For A Multi-Cloud Service Environment," which is hereby incorporated by reference in its entirety.

TECHNICAL FIELD

The present disclosure relates to cloud computing, and more specifically, custom device configuration and behavior pattern-based validation in a multi-cloud service environment.

BACKGROUND

Cloud computing generally refers to the use of scalable computing resources accessible via a network, such as the Internet. A series of computing resources, often referred to as a "cloud," may provide a variety of services or resources to users. Services may be of various types, which may include for examples, software applications, platforms, infrastructure, and/or data storage. Names of such services may include, Software-as-a-Service (SaaS) or Infrastructure-as-a-Service (IaaS) among others. Other "cloud resources" may refer not only to services provided by a cloud-based system, but also resources provisioned from such a cloud service provider. Examples may include cloud-based storage or virtualized computers for use for particular applications. Cloud services and/or resources may provide public, private, or hybrid clouds to facilitate the delivery of cloud services and/or resources to a variety of customers.

Typically, to communicate with a cloud-based service, a specific agent is generally required to communicate with that one, and only that one cloud service type. In this way devices which utilize cloud services are locked into the specific cloud service type the device is configured for. This approach is a serious concern for future scalability, reuse, and compatibility of devices operating in a multi-cloud service environment.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

SUMMARY

Figure 1A:
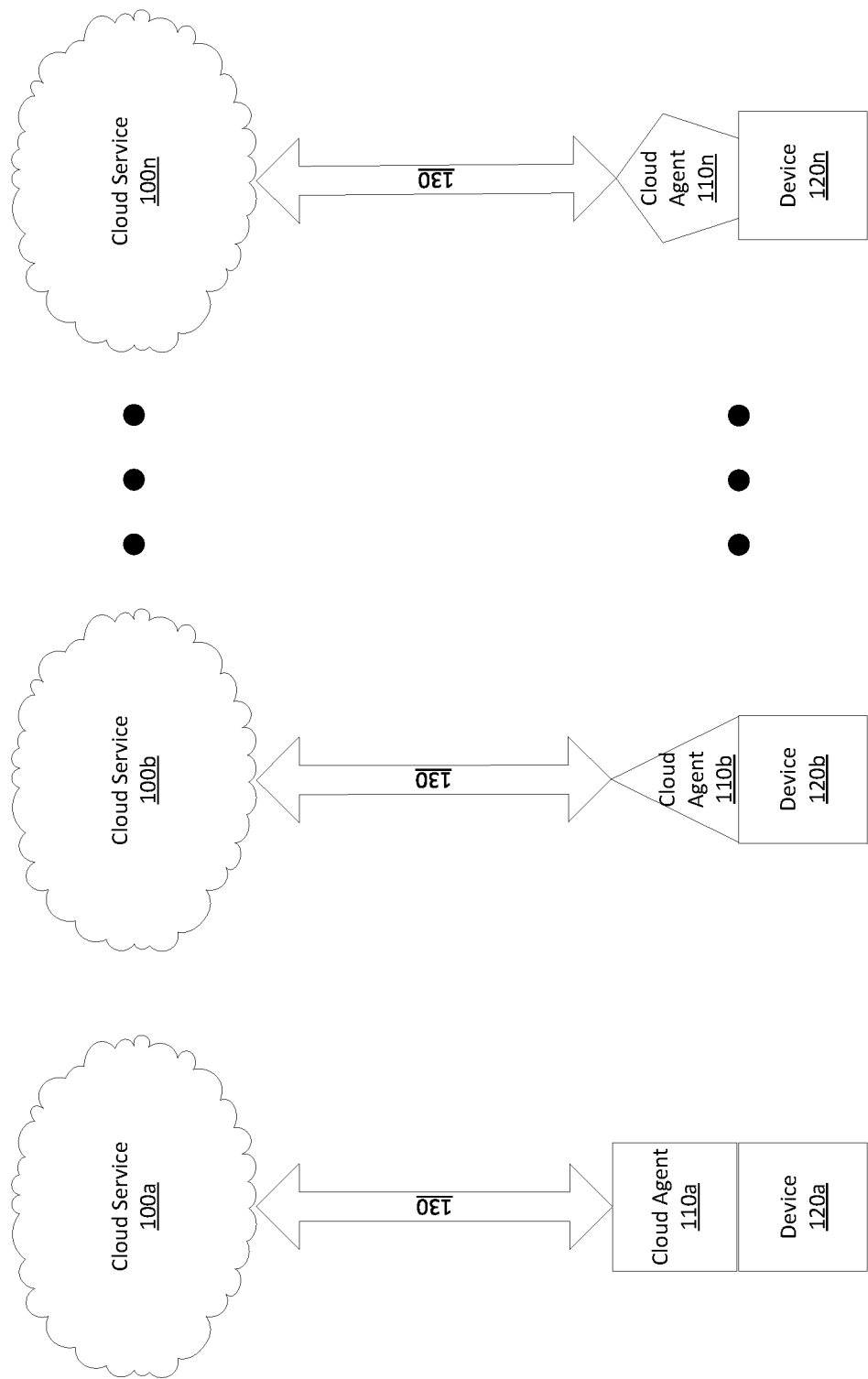
FIG. 1A illustrates an example of devices pre-configured with a cloud agent directly associated with a specific cloud service, according to one embodiment described herein.

One embodiment described herein provides a method of dynamically configuring a device for a cloud-based environment. The method includes receiving a configuration request for a device. The method also includes processing the configuration request to determine one or more customization characteristics. Additionally, the method includes configuring the device with the one or more customization characteristics to dynamically update the device. The method further includes determining a software module from a repository for the device based on the one or more customization characteristics. The method includes installing the software module on the device. The method also includes performing a multi-part verification operation on the device, wherein the multi-part verification operation includes at least a multi-cloud verification operation and a runtime behavior analysis.

Another embodiment described herein provides a system that includes one or more computer processors and a memory containing computer program code that, when executed by operation of the one or more computer processors, performs an operation for performing the multi-part verification operation on the device. The operation includes configuring the device with one or more customization characteristics to dynamically update the device. The operation also includes selecting and installing a software module on the device, based on the one or more customization characteristics. Additionally, the operation includes, during execution of the software module on the device within a first cloud computing environment, collecting data for a plurality of predefined data values over a window of time. The operation further includes analyzing the collected data to identify one or more execution behavior patterns for the software module. The operation comparing the identified one or more execution behavior patterns with one or more predefined patterns of expected behavior for the software module. The operation also includes, upon determining that the identified one or more execution behavior patterns do not correspond to the one or more predefined patterns of expected behavior for the software module, generating and transmitting a notification.

Another embodiment described herein provides a non-transitory computer-readable medium containing computer program code that, when executed by operation of one or more computer processors, performs an operation. The operation includes configuring a device with one or more customization characteristics and installing a software module on the device, based on the one or more customization characteristics. The operation also includes performing a verification operation of the installed software module across a plurality of cloud computing environments, for each of the plurality of cloud computing environments, executing the software module on the device within the cloud computing environment. The verification operation also includes, during execution of the software module, collecting data for a plurality of predefined data values over a window of time. Additionally, the verification operation includes analyzing the collected data to identify one or more execution behavior patterns for the software module. The operation further includes selecting one or more predefined patterns of expected behavior for the software module. The operation includes comparing the identified one or more execution behavior patterns with the selected one or more predefined patterns of expected behavior for the software module. The operation also includes, upon determining that the identified one or more execution behavior patterns do not correspond with the one or more predefined patterns of expected behavior for the software module, generating and transmitting a notification.

DETAILED DESCRIPTION

Cloud computing generally refers to the use of scalable computing resources accessible via a network, such as the Internet. A set of computing resources, often referred to as a "cloud," may provide a variety of services or resources to users. Services may be of various types, which may include for examples, software applications, platforms, infrastructure, and/or data storage. Names of such services may include, Software-as-a-Service (SaaS) or Infrastructure-as-a-Service (IaaS) among others. Other "cloud resources" may refer not only to services provided by a cloud-based system, but also resources provisioned from such a cloud service provider. Examples may include cloud-based storage or virtualized computers for use for particular applications. Cloud services and/or resources may provide public, private, or hybrid clouds to facilitate the delivery of cloud services and/or resources to a variety of customers.

Typically, to communicate with a cloud-based service, a specific agent is generally required to communicate with that one, and only that one cloud service type. For example, for a device to communicate with Microsoft® Azure®, the device generally must run a suitable agent specifically configured to connect with the Azure® cloud computing environment. However, such agents are typically designed to connect to a specific cloud computing environment and generally are unable to connect to other cloud computing environments. In this way devices which utilize cloud services are locked into the specific cloud service type the device is initially configured for. This approach is a serious concern for future scalability, reuse, and compatibility of devices operating in cloud service environments.

To address the problems of compatibility and reuse among others, systems and methods for dynamic configuring a device for a cloud-based environment may be utilized as described in this disclosure. One or more devices may be completed from manufacturing yet unable to operate in a cloud service environment without appropriate cloud service agents. One or more devices may utilize a customization bootstrap library provided by the manufacturer of the devices to install the appropriate cloud service agents. Additionally, a firmware version may be chosen which comports with the customized cloud service agent and environment the device will be deployed in. A now fully customized device is configured just in time to be deployed into a cloud services environment. As the method is highly configurable, that same devices may be re-configured dynamically and re-deployed to a different cloud services environment as necessary to meet the various needs of the customer.

Embodiments of the present disclosure provide several benefits. These include, but are not limited to, enhanced manufacturability of devices. Various embodiments of the disclosure, methods to provide devices which may be manufactured without a defined relationship to a Cloud Service Provider (cloud service provider) and in very late stages of deployment to a customer, including the possibility of at the customer site itself may be configured in a Just-In-Time (JIT) fashion to provide a compatible cloud service provider device while helping to guarantee a valid operation of the device.

Further, embodiments contemplate methods to provide devices which are highly configurable with elements such as customized cloud service agents, device functionality, and/or firmware able to be changed dynamically to be utilized in a variety of configurations which are application specific.

Finally, embodiments contemplate methods to provide devices and supporting infrastructure than may analyze communication between a cloud service provider and the associated devices. Based on the analysis of the communication and the observed behavior of the cloud service provider and/or the associated devices, a dynamic configuration may be communicated to a device to execute one or more actions on one or multiple devices based on the analyzed data.

FIG. 1A illustrates an example of specific devices directly associated with a specific cloud service. In one example a Cloud Service Provider (cloud service provider) 100a is illustrated. Such a cloud service provider may provide any type of services or resources typical of such providers. Examples may include but are not limited to services for customer management or resources such as storage. A device 120a to be utilized with the cloud service is bound with a cloud agent 110a, and this pairing is capable of communication via a communication path 130 to the associated cloud service provider 100a.

It should be appreciated, the device-cloud agent pairing is bound for a specific cloud service provider and is not flexible. This means that the devices many not be re-configured for a new or different cloud service provider or redeployed. In this way, each cloud service provider 100a, 100b, to any number 100n, requires a communicating bound pair of devices 120a, 120b, 120n and cloud agent 110a, 110b, 110n respectively.

Figure 1B:
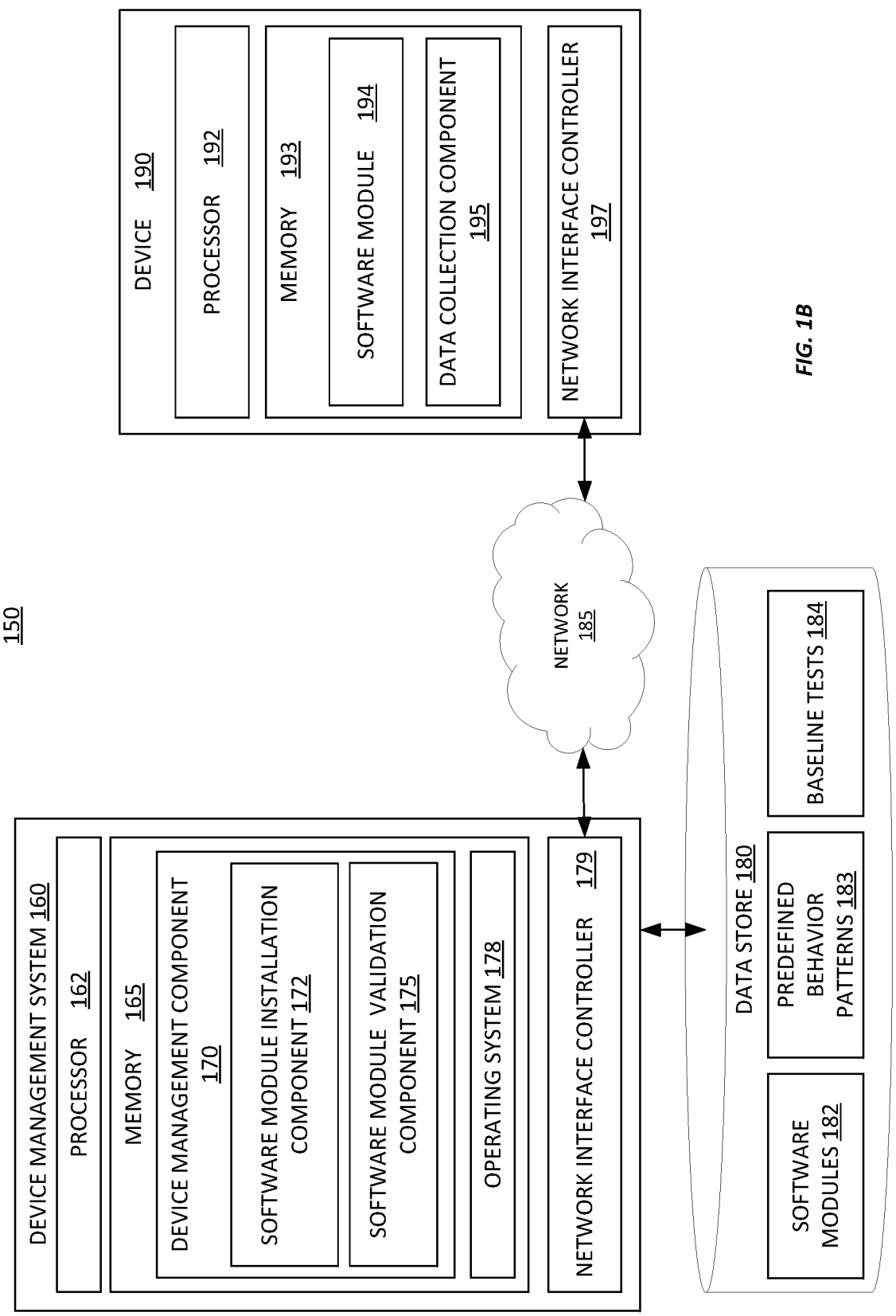
FIG. 1B illustrates a system configured with a device management component, according to one embodiment described herein.

FIG. 1B illustrates a system configured with a device management component, according to one embodiment described herein. As shown, the system 150 includes a Device Management System 160 and a Device 190, interconnected via a network 185. Generally, the network 135 represents any suitable data communications network, with examples including (without limitation) a local area network (LAN), a wide area network (WAN), an IEEE 802.11 wireless network, and so on.

The Device Management System 160 includes one or more computer processors 112, a memory 165, and a network interface controller 179. The memory 165 contains a device management component 170 and an operating system 178. Generally, the device management component 170 represents software logic that can install a software module on the device 190 and validate the operation of the software module. As described herein, a software module refers to any software component, including (without limitation) device firmware, a software application, a module for a software application, a suite of software applications, and so on. Generally, the operating system 178 represents any suitable operating system for a computing device. Device Management System 160 is communicatively coupled to a data store 180, which in the depicted embodiment contains software modules 182, predefined behavior patterns 183 and baseline tests 184.

The device 190 includes a processor 192, memory 193 and a network interface controller 197. Any general-purpose computer systems used in various embodiments of this disclosure may be, for example, general-purpose computers with general-purpose computer processors. For example, the processors 162 and 192 may include processors based on Intel PENTIUM-type processor, Motorola PowerPC, Sun UltraSPARC, Hewlett-Packard PA-RISC processors, ARM-based processors or any other type of processor. Generally, the processors 162 and 192 represent any suitable processor(s), including commercially available processors such as the well-known Pentium class processor available from the Intel Corporation. Many other processors are available. Such a processor usually executes an operating system (not shown) which may be, for example and without limitation, Microsoft® Windows®, Apple® macOS®, Solaris®, UNIX®, or Linux®. Many other operating systems may be used.

The memories 165 and 193 generally represents any suitable form of addressable computer memory. For example, the memories 165 and 193 may represent a volatile memory (e.g., static random-access memory (SRAM)) and/or a non-volatile memory (e.g., Flash memory). More generally, any suitable form of memory device(s) can be used, consistent with the functionality described herein. Generally, the processor and operating system together define a computer platform for which application programs in high-level programming languages are written. It should be understood that embodiments of the present disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

The device management component 170, as shown, contains a software module installation component and a software module validation component 175. In one embodiment, the device management component 170 can dynamically configure the device 190 for a cloud-based environment. For example, the device management component 170 can receive a configuration request for a device and can process the configuration request to determine one or more customization characteristics. The device management component 170 can configure the device with the one or more customization characteristics to dynamically update the device. In one embodiment, the software module installation component 172 determines a software module from a software module repository 182 for the device based on the one or more customization characteristics. The software module installation component 172 installs the software module on the device.

The software module validation component 175 can then perform a multi-part verification operation on the device, wherein the multi-part verification operation includes at least a multi-cloud verification operation and a runtime behavior analysis. For example, the software module validation component 175 could execute a sequence of tests from the baseline tests 184 against the software module 194 installed on the device 190. The software module validation component 175 could then determine whether the software module 194 behaves as expected (e.g., as specified in the baseline tests 184) in response to the various tests. In one embodiment, a test comprises a sequence of operations according to a higher-level workflow (also referred to herein as a contract). Additionally, each operation in the contract can correspond to a plurality of Application Program Interface (API) calls by the software module 194 to an API provided by a cloud service. In such an example, the baseline tests 184 can specify the sequence of API calls as well as parameter values for one or more of the API calls.

Additionally, the software module validation component 175 can perform a runtime behavior analysis of the software module 194 installed on the device 190. For example, the software module validation component 175 could receive data values collected by the data collection component 195 for a plurality of predefined data metrics, during the execution of the software module 194. The plurality of predefined data metrics could include, without limitation, a number of data messages transmitted by the software module 194 during a window of time, a number of transactions processed by the software module 194 during a window of time, performance metrics of the device 190 (e.g., processor usage, memory usage, network usage, etc.) and so on.

The software module validation component 175 could then determine a pattern of behavior that is exhibited from the execution of the software module 194 and can compare the exhibited pattern of behavior with the one or more predefined patterns of expected behavior 183 in the data store 180. If the patterns substantially match one another, the software module validation component 175 can determine that the software module 194 was installed successfully and is operating as expected. In comparing the patterns, the software module validation component 175 could calculate a measure of difference between the two patterns (e.g., by performing a statistical analysis of the pattern data, such as a Kolmogorov-Smirnov test) and could compare the calculated measure of difference with a predefined maximum measure of difference. If the calculated measure of difference is less than the predefined maximum measure of difference, the software module validation component 175 could determine the patterns substantially match one another. If the software module validation component 175 determines the patterns do not substantially match (e.g., if the calculated measures of difference exceed the predefined maximum), the software module validation component 175 could generate and transmit a notification, indicating that a problem may exist with the installed software module 194.

In one embodiment, where a device type of the device 190 is not known, the software module validation component 175 could use the data collected by the data collection component 195 to classify the device 190 as one of a plurality of known device types. For example, a machine learning classifier could be trained to classify devices as one of the plurality of known device types, based on inputs representing the device's behavior and attributes. The software module validation component 175 could then input data collected from the data collection component 195 into the machine learning classifier to determine a predicted device type for the device 190. The predicted device type could be used, for example, to select software modules 182 to install on the device 190, to determine which predefined behavior patterns 183 to use for testing the operation of the device 190, to select which baseline tests from the baseline tests 184 to execute against the device, and so on.

Figure 2A:
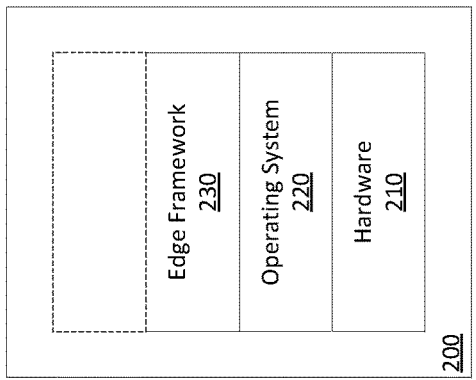
FIG. 2A illustrates an example block diagram of a device prior to dynamic customization in accordance with various embodiments of the disclosure, according to one embodiment described herein.

FIG. 2A illustrates an example block diagram of a device prior to dynamic customization in accordance with various embodiments of the disclosure. Embodiments of the disclosure contemplate devices 200 prior to dynamic customization comprising several hardware and/or software modules which serve to allow the necessary flexibility for benefits of the disclosure.

A pre-dynamic customization device 200 may have at least a physical hardware layer 210. It is appreciated this hardware in some embodiments may be virtual in nature. Such hardware 210 represents the foundation on which the operating system 220 for the device 200 interacts to provide the desired functionality of the device itself.

An edge framework 230 layer may be utilized as well and contain functionality such as to define the characteristics of the device 200 itself (e.g. a temperature sensor) and/or provide necessary functionality to perform the functions it was designed for. One example of such functions may be a bootloader where such a layer is necessary to allow customized configurations as well as fundamentals such as the device firmware to be loaded onto the device 200. In this way a device 200 may have a set of hardware or similar capabilities, however may be utilized based on available dynamic customization as any device 200 that utilizes the available resources available to the device 200.

It should be appreciated that this pre-dynamic customization device 200 while functional in some environments, is not capable of operating in a cloud service provider environment until it is transformed by the systems and methods of the present disclosure into a configured device.

Figure 2B:
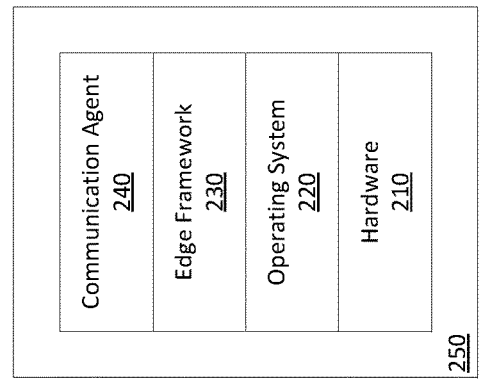
FIG. 2B illustrates an example block diagram of a cloud service capable device after dynamic customization in accordance with various embodiments of the disclosure, according to one embodiment described herein.

FIG. 2B illustrates an example block diagram of a device after dynamic customization in accordance with various embodiments of the disclosure. Once the device 200 has completed embodiments of the dynamic customization process described herein, a transformation occurs with the inclusion of a specific cloud communication agent 240 layer. This layer is specific to a particular cloud computing environment and may be configured dynamically at deployment time in a cloud service provider environment to allow maximum flexibility for the particular application. In this way a pre-configured device 200 unable to be used in a cloud service provider environment is transformed into a cloud service capable device 250 and may be deployed into an appropriate cloud service provider environment and dynamically re-deployed as appropriate for a distinct cloud service provider environment as required.

Figure 3:
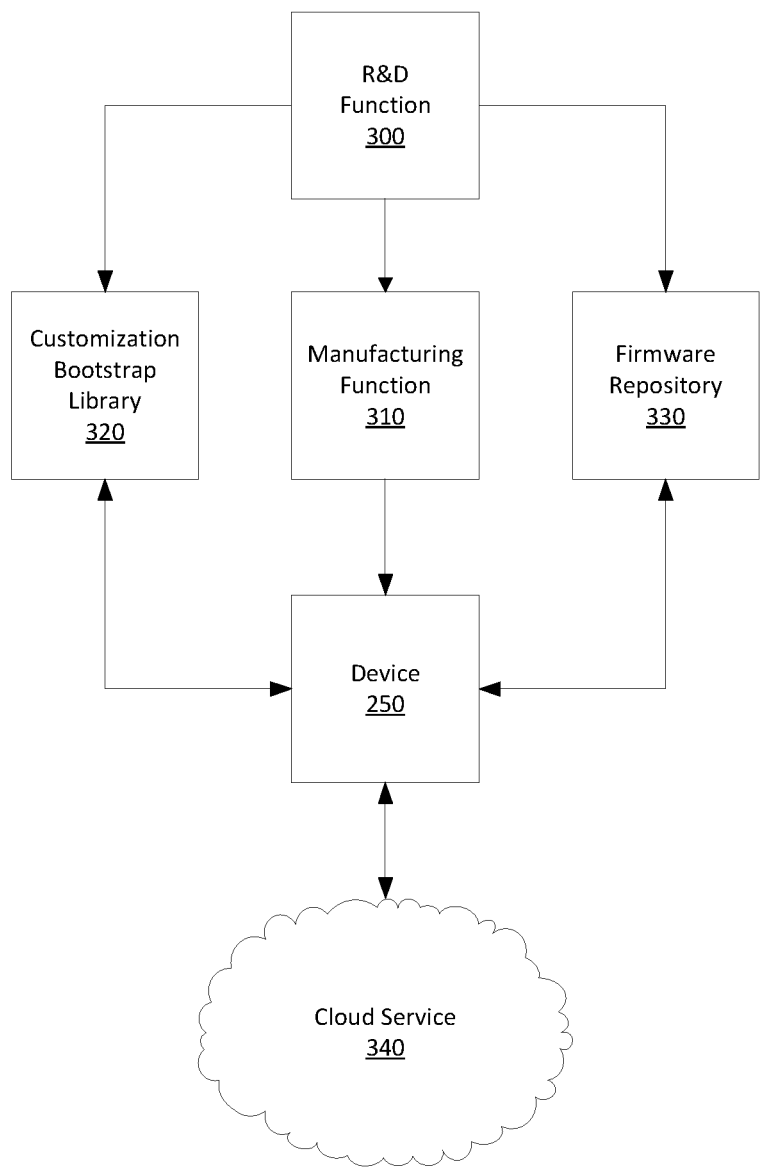
FIG. 3 illustrates an example functional block diagram of dynamically configuring a custom device for a cloud-based environment in accordance with various embodiments of the disclosure, according to one embodiment described herein.

FIG. 3 illustrates an example functional block diagram of dynamically configuring a custom device for a cloud-based environment in accordance with various embodiments of the disclosure. Embodiments of the disclosure contemplate an Research and Development (R&D) function producing several artifacts for the transformation of a device 200 into a cloud service capable device 250 which is ultimately connected to a cloud service provider 340.

R&D 300 may provide general guidance, direction, specifications, and/or other support to a manufacturing function 310 who may be ultimately responsible for the manufacturing of a device 200. Further, R&D 300 may be responsible for the creation and maintenance of various libraries and/or repositories of artifacts utilized in the transformation of a device 200 into a cloud service capable device 250. For example, R&D may generate the baseline tests 184 shown in FIG. 1C and discussed above. A customization bootstrap library 320 may be utilized to determine the appropriate cloud communication agent 240 layer to be utilized. As described herein, this layer is specific to a particular cloud service provider and may be configured dynamically at deployment time in a cloud service provider environment to allow maximum flexibility for the particular application. This layer may also be utilized to provide functionality to a particular device (e.g. thermostat) and define its custom functions. A firmware repository 330 may be utilized to provide functionality to the device or to augment the functionality of the operating system 220 for the device. Both the customization bootstrap library 320 and firmware repository 330 may be local resources during manufacture time, remote resources available to the cloud service capable device 250 able to be contacted via a network to re-configure the device dynamically, or some combination of the two environments such as local upgrade options for a deployed device.

It should be appreciated examples of these systems and operations are multitude and a large variety of combinations exist where the benefits of the disclosure are contemplated.

It is further contemplated that any associated hardware may be virtual in nature and physical devices are not a requirement of some embodiments of the disclosure.

Figure 4:
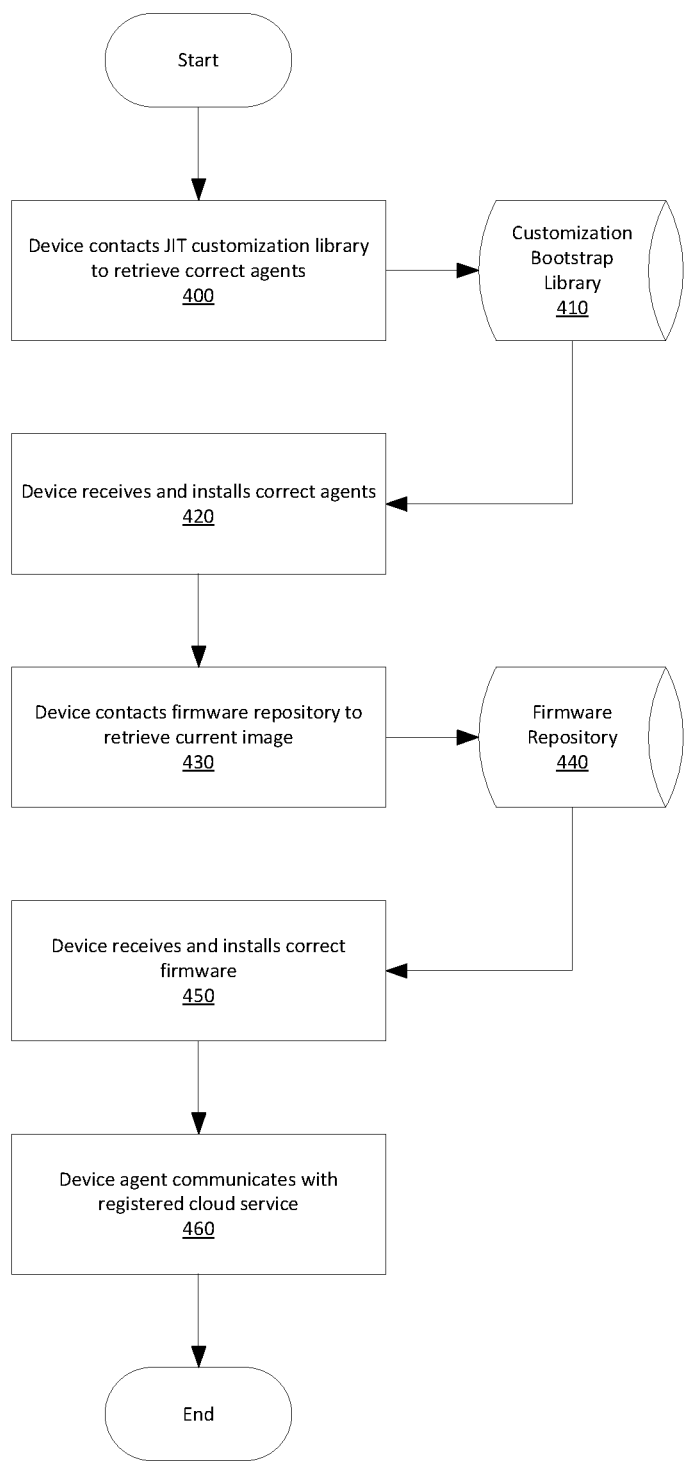
FIG. 4 illustrates an example flow diagram for methods of dynamic configuration of a custom device for a cloud-based environment in accordance with various embodiments of the disclosure, according to one embodiment described herein.

FIG. 4 illustrates an example flow diagram for methods of dynamic configuration of a custom device for a cloud-based environment in accordance with various embodiments of the disclosure. One embodiment of a flow to transform a device 200 into a cloud service capable device 250 may start where a device 200 contacts, is contacted, or subjected to a library to retrieve the correct cloud customization agents 400. It should be appreciated these agents may be for a commercial cloud service provider, test agents, or other agents a desired to customize a device 200 for purposes other than deployment into a cloud service provider.

A device 200 may contact a customization bootstrap library 410 which may be local, remote, or some combination, and contain various cloud agent or other customized code for use in the various deployment applications of the device 200. A device 200 will receive and install the correct agents 420 and may conduct a self-test to determine if the agents were correct, properly loaded, and/or other tests as required by the application.

A device 200 may now contact a firmware repository 440 which may be local, remote, or some combination, and contain various operational code for use in the various deployment applications of the device 200. A device 200 will receive and install the correct firmware version 450 and may conduct a self-test to determine if the firmware was correct, properly loaded, and/or other tests as required by the application.

Similar to the agent process, it should be appreciated these firmware versions may be for a wide variety of applications for the given receiving platform. This may include a desire to customize a device 200 for purposes other than deployment into a cloud service provider. A cloud service capable device 250 may now communicates with a cloud service provider 460 or other serves as determined by the customization which has occurred through the process.

Figure 5:
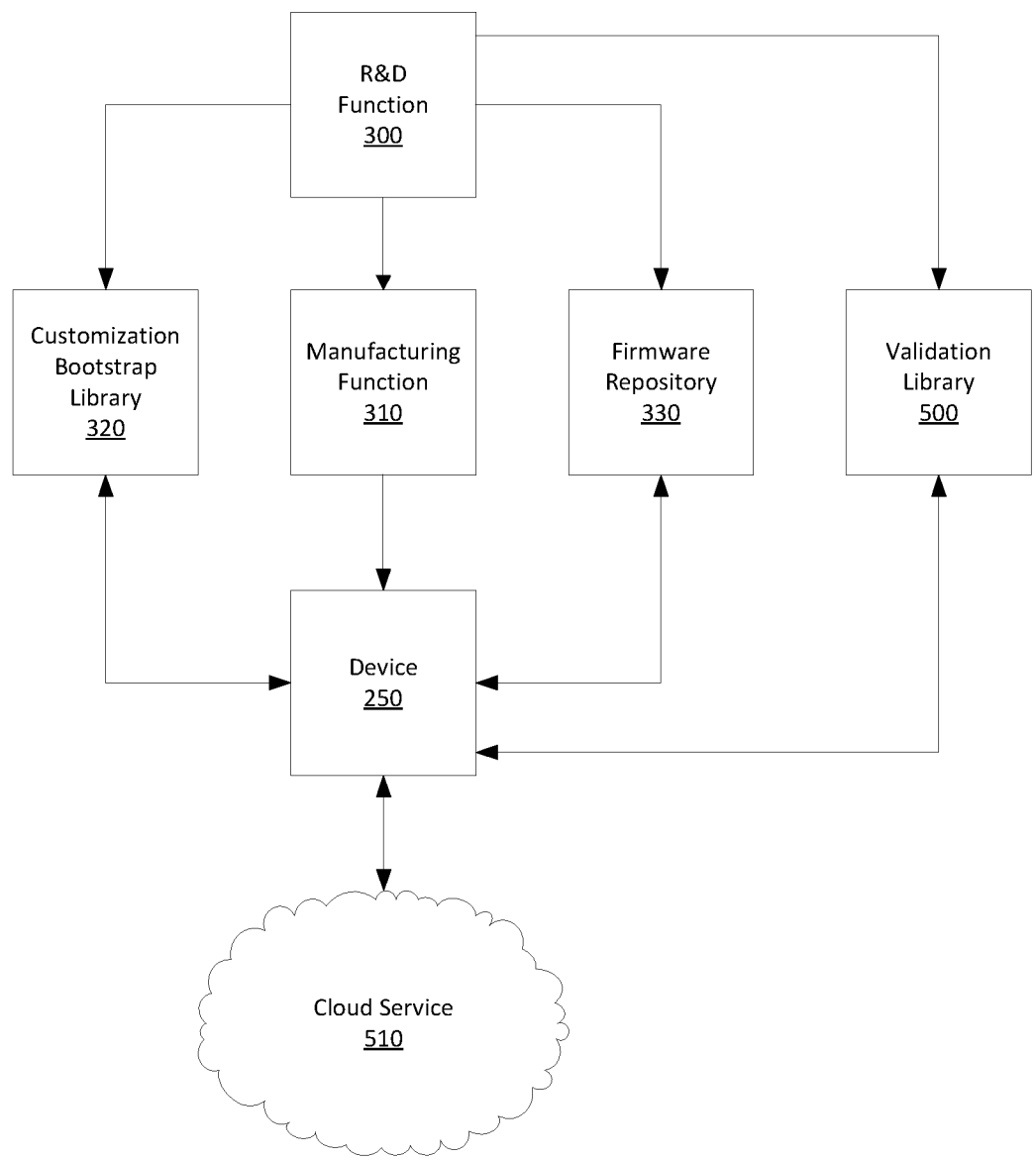
FIG. 5 illustrates an example functional block diagram of dynamically configuring a custom device including validation for a cloud-based environment in accordance with various embodiments of the disclosure, according to one embodiment described herein.

FIG. 5 illustrates an example functional block diagram of dynamically configuring a custom device including validation for a cloud-based environment in accordance with various embodiments of the disclosure. Validation in this context may be a validation of a cloud service capable device 250 that is fully configured yet has not been deployed until it is tested against a validation library 500 or associated validation service. In this way a cloud service capable device 250 may be confirmed to be operating as expected with an approximated cloud service provider. Alternately if the validation does not operate as anticipated, elements of the customization or the device 200 itself may be altered to allow the desired result with the actual cloud service provider 510.

It should be appreciated that several elements of the transformation may require changes, which is a benefit of embodiments of the disclosure which is to allow maximum flexibility and rapid deployment of cloud service provider solutions which are scalable.

Figure 6:
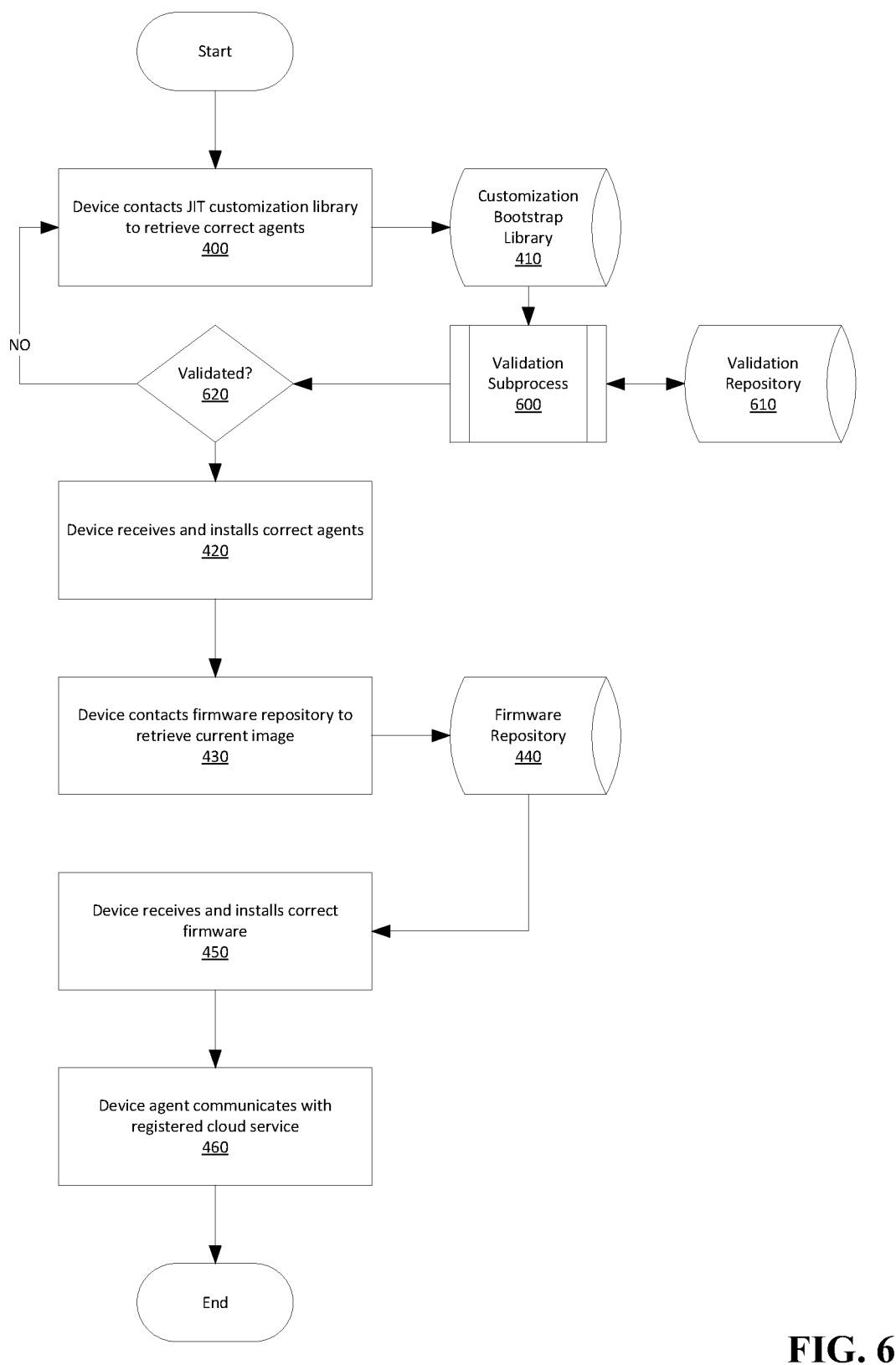
FIG. 6 illustrates an example flow diagram for methods of dynamic configuration including validation of a custom device for a cloud-based environment in accordance with various embodiments of the disclosure, according to one embodiment described herein.

FIG. 6 illustrates an example flow diagram for methods of dynamic configuration including validation of a custom device for a cloud-based environment in accordance with various embodiments of the disclosure. It should be appreciated that validation need not occur as a part of deployment of a device. Embodiments contemplate validation of the operation of a cloud service capable device 250 may be performed outside of the deployment of any physical devices and may be performed before any such deployment.

Additionally, embodiments contemplate a validation subprocess 600 as part of the larger flow to transform a device 200 into a cloud service capable device 250 and ultimately deploy to a cloud service provider. In such a process, after the customization step, a validation subprocess 600 may be run and determine if the device is validated 620 or ready to be utilized in a cloud service provider. A validation repository 610 may be utilized to store necessary elements of a device 200 to accomplish this validation. If such a configuration is validated, the process may continue to install the correct agents 420 and proceed as with embodiments of FIG. 4. If the configuration is not validated, the process may return to retrieve the correct agents 400, as in the illustrated example.

It should be appreciated various embodiments of this process exist, where the process may stop if validated, iterate on various configurations, validate after installation of the correct firmware 450, and/or validate after an initial communication with the registered cloud service 460. Multiple validation points are contemplated in the present disclosure and may be utilized in a one time, and/or periodic fashion to validate continuous operation of a cloud service provider, devices, and/or system(s).

Figure 7:
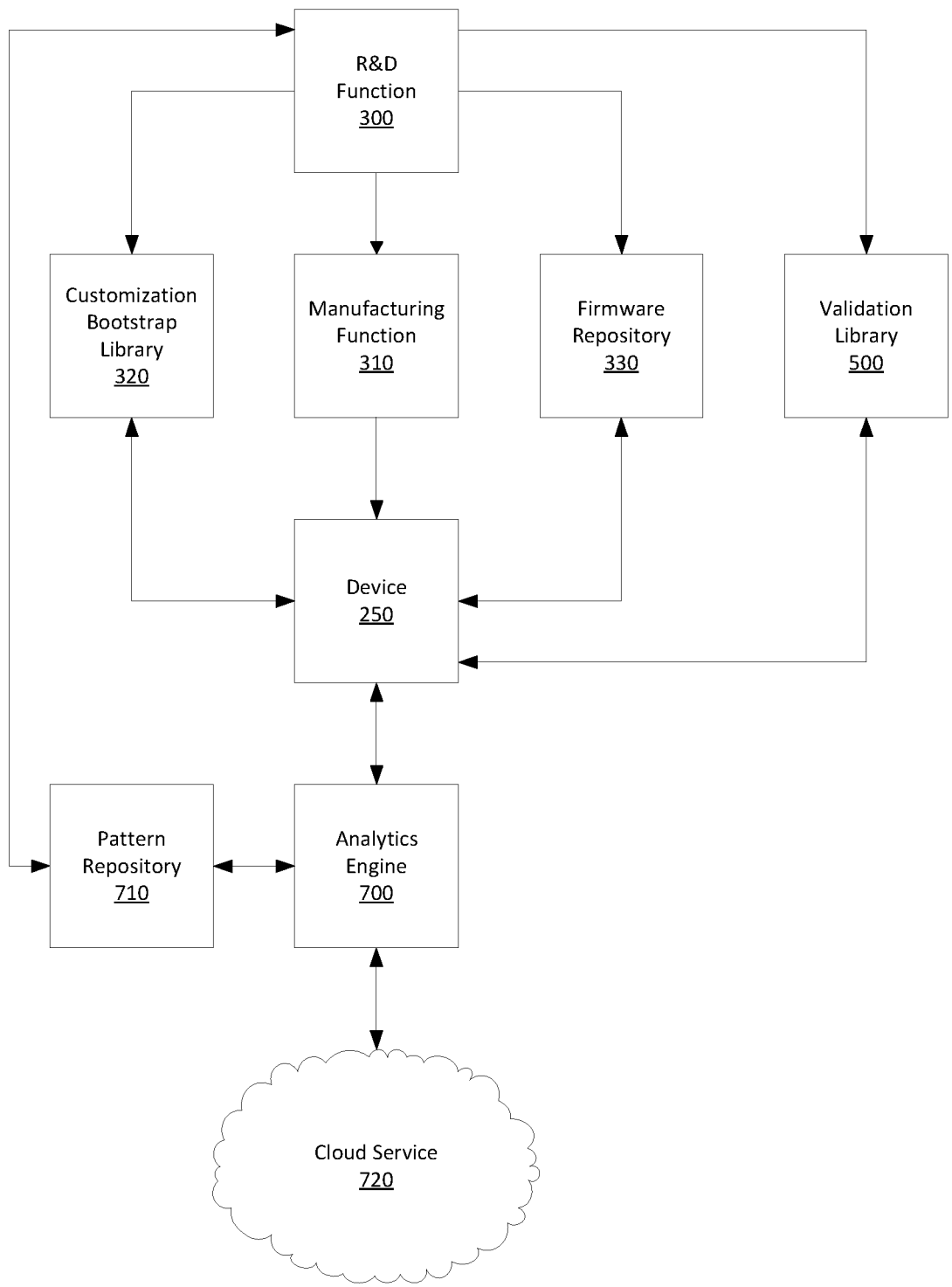
FIG. 7 illustrates an example functional block diagram of dynamically configuring a custom device including validation and an analytics and pattern engine for a cloud-based environment in accordance with various embodiments of the disclosure, according to one embodiment described herein.

FIG. 7 illustrates an example functional block diagram of dynamically configuring a custom device including validation and an analytics and pattern engine for a cloud-based environment in accordance with various embodiments of the disclosure. In this context as a cloud service provider 720 may transact a significant amount of information with a device and be stored locally in an event log or remotely for all devices in a system log, a benefit exists to analyze this transacted data for patterns and an opportunity to process this data into actionable activities for a system.

Examples of data that may be collected include, but are not limited to addresses, TLS parameters, connection details (e.g., IP address, port, proxy/no proxy), protocol (e.g., MQTT, HTTP), encryption utilized, timing information, message details, and/or data patterns. It should be appreciated both the type and amount of data are various and the contemplated disclosure does not rely on any single type or amount of data.

Once collected or transacted this data may be processed by an analytics engine 700 to determine what if any characteristics may exist. Additionally, a comparison may be accomplished between data being processed and existing patterns which may exist in a pattern repository 710. Based on the relative pattern, and types of matching (e.g. exact, fuzzy, none . . . ) corresponding actions may be taken. A few examples are illustrative.

In one example, if all transacted data stops for a period of time, it may be determined that the cloud service capable device 250 is no longer operating properly and should be reset remotely if possible in attempt to restart a possibly malfunctioning device. In another example, if all transacted data suddenly increases by 10000% on a particular TCP port, it may be determined that a Denial Of Service (DOS) attack is underway. As one possible action, the cloud service capable device 250 may dynamically alter its configuration to close the port from which the traffic was flowing.

In yet another example, if characteristics of the cloud service provider (e.g. timing) have changed from "cloud service provider A" as originally deployed, to "cloud service provider B" as recognized by the analytics engine 700 and pattern repository 710, the cloud service capable device 250 may dynamically configure its cloud agent to operate with "cloud service provider B." In this way, an operator need not reinstall or redeploy physical products, nor redeploy firmware as the analytics engine 700 may recognize the change in cloud service provider and through prior knowledge, dynamically re-configure and redeploy itself for the new cloud service environment.

Figure 8:
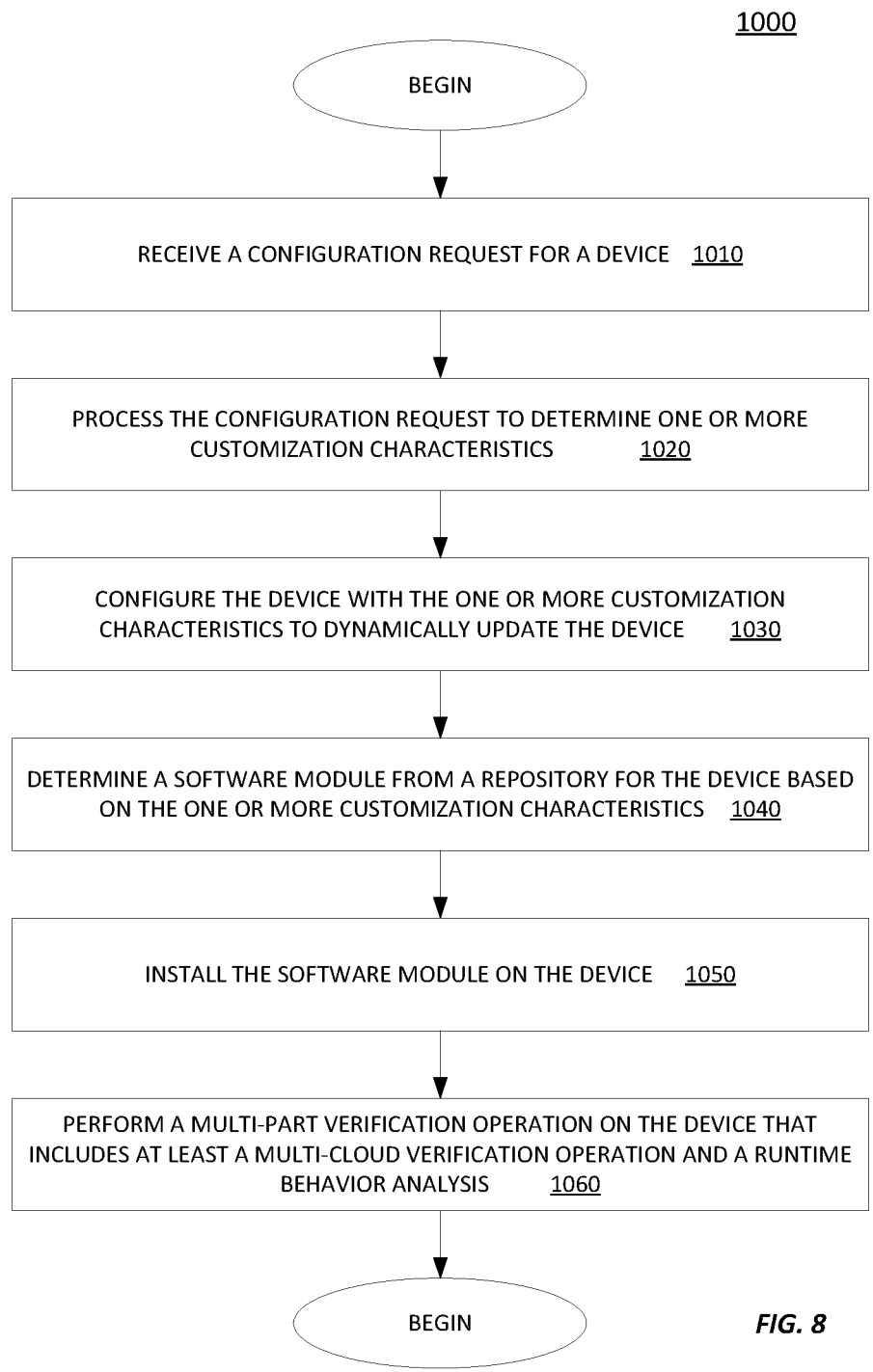
FIG. 8 is a flow diagram illustrating a method for verifying a configuration of a device, according to one embodiment described herein.

FIG. 8 is a flow diagram illustrating a method for verifying a configuration of a device, according to one embodiment described herein. As shown, the method 1000 begins at block 1010, where the device management component 170 receives a configuration request for a device. The device management component 170 processes the configuration request to determine one or more customization characteristics for the device (block 1020). The device management component 170 then configures the device with the one or more customization characteristics to dynamically update the device (block 1030).

At block 1040, the software module installation component 172 determines a software module from a repository for the device, based on the one or more customization characteristics. The software module installation component 172 installs the software module on the device (block 1050). The software module validation component 175 then performs a multi-part verification operation for the device that includes at least a multi-cloud verification operation and a runtime behavior analysis (block 1060), and the method 1000 ends. In performing the multi-part verification operation for the device, the software module validation component 175 can perform a sequence of operations that are each carried out by the device or by a cloud service in a cloud computing environment.

Figure 9:
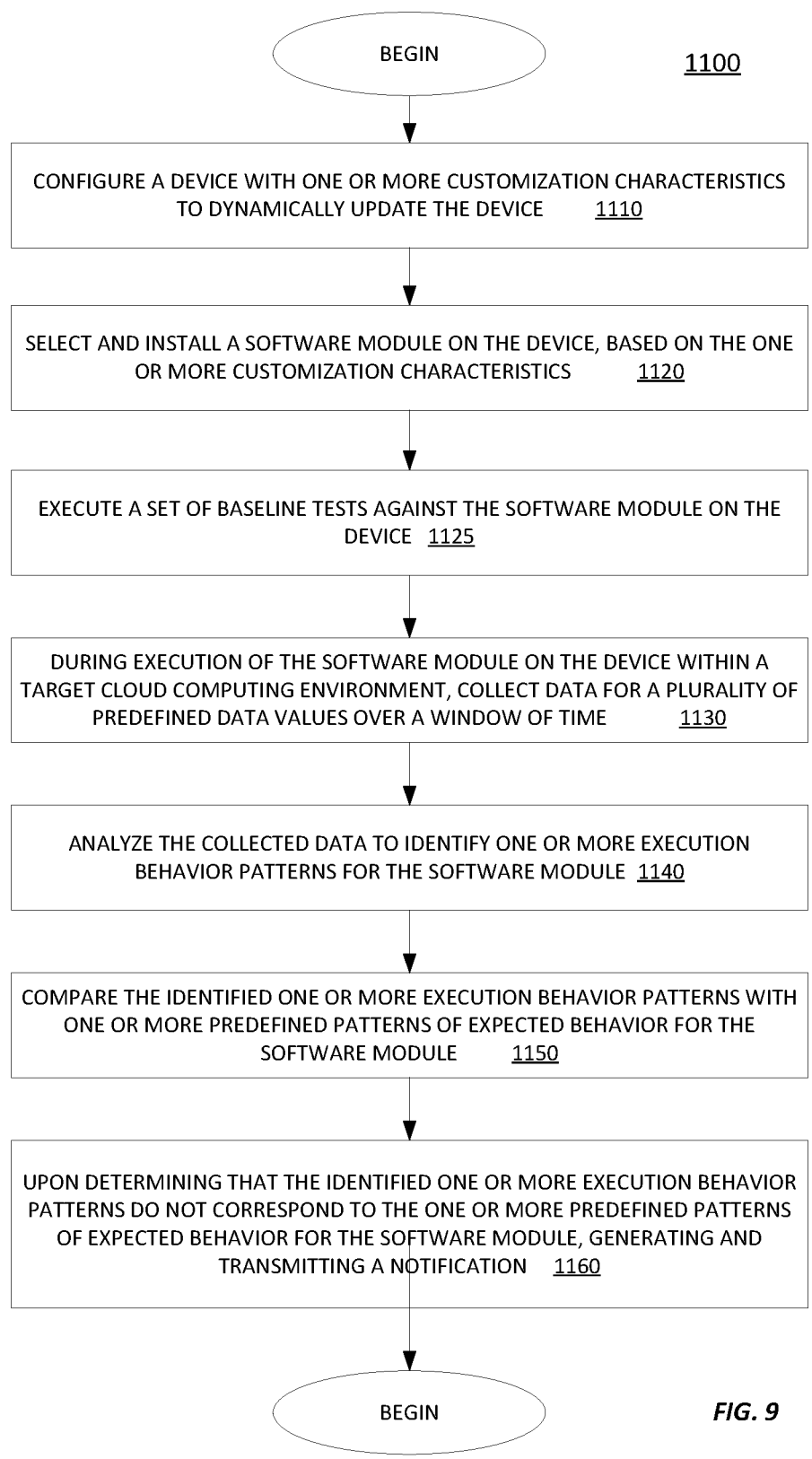
FIG. 9 is a flow diagram illustrating a method for verifying a configuration of a device for a particular cloud computing environment, according to one embodiment described herein.

FIG. 9 is a flow diagram illustrating a method for verifying a configuration of a device for a particular cloud computing environment, according to one embodiment described herein. As shown, the method 1100 begins at block 1110, where the device management component 170 configures a device with one or more customization characteristics to dynamically update the device. The software module installation component 172 selects and installs a software module on the device, based on the one or more customization characteristics (block 1120).

The software module validation component 175 then executes a set of baseline tests against the software module (block 1125). During the execution of the software module on the device within a target cloud computing environment, the software module validation component 175 collects data for a plurality of predefined data metrics of a window of time (block 1130). For example, a data collection component 195 executing on the device could collect and transmit data values for the plurality of predefined data metrics to the software module validation component 175.

The software module validation component 175 analyzes the collected data to identify one or more execution behavior patterns for the software module (block 1140). The software module validation component 175 then compares the identified one or more execution behavior patterns with one or more predefined patterns of expected behavior for the software module (block 1150). If the software module validation component 175 determines that the identified patterns do not match the predefined patterns, the software module validation component 175 generates and transmits a notification (block 1160), indicating that the software module is not functioning as desired, and the method 1100 ends. On the other hand, if the software module validation component 175 determines the patterns do match, the software module validation component 175 could provide an indication that the software module is functioning in an intended manner.

Figure 10:
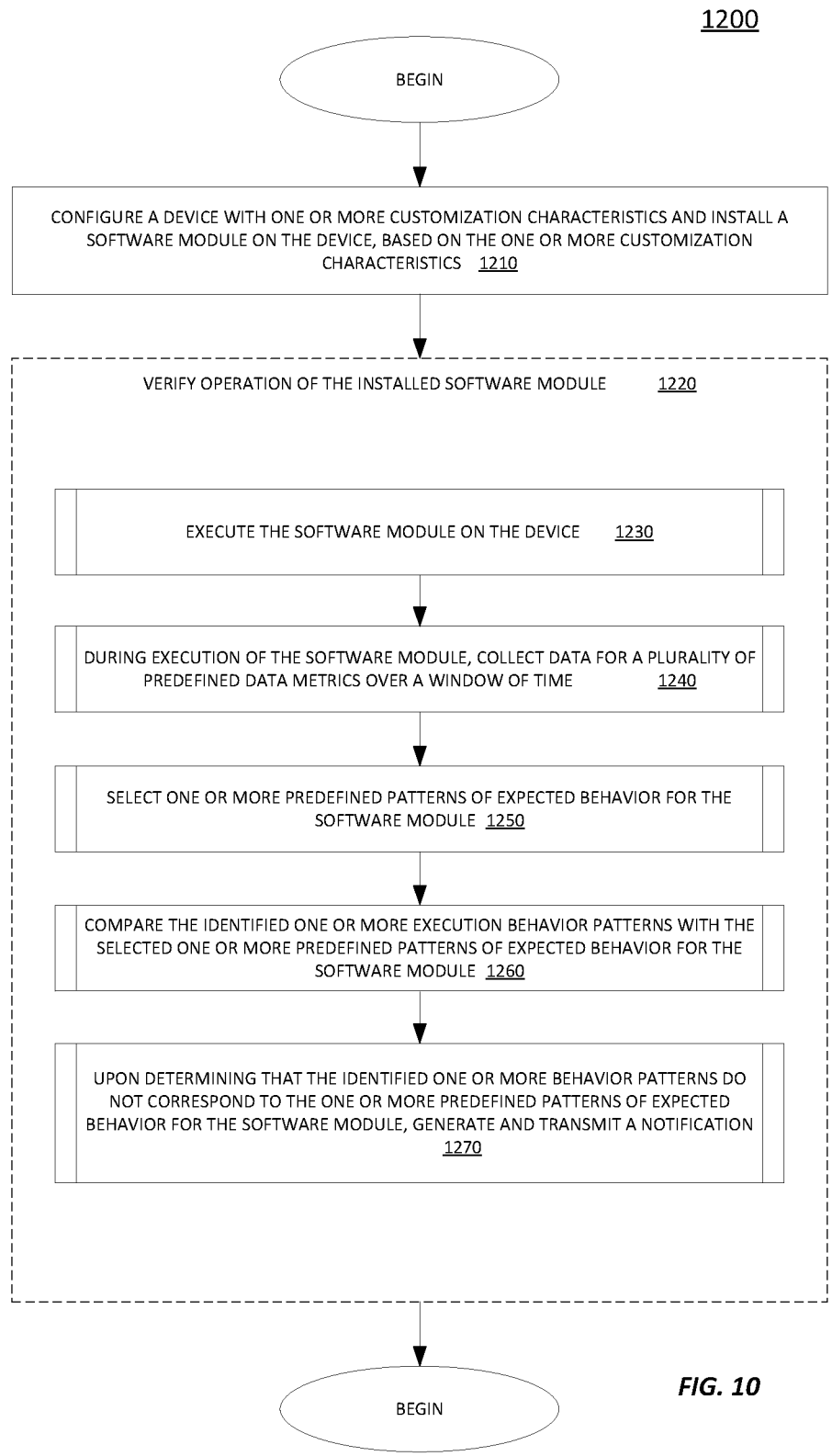
FIG. 10 is a flow diagram illustrating a method for verifying a configuration of a device across multiple cloud computing environments, according to one embodiment described herein.

FIG. 10 is a flow diagram illustrating a method for verifying a configuration of a device across multiple cloud computing environments, according to one embodiment described herein. The method 1200 begins at block 1210, where the device management component 170 configures a device with one or more customization characteristics and the software module installation component 172 installs a software module on the device, based on the customization characteristic(s). The software module validation component 175 then verifies the operation of the installed software module (block 1220). In doing so, the software module validation component 175 executes the software module on the device (block 1230) and during execution of the software module, the software module validation component 175 collects data for a plurality of predefined data metrics over a window of time (block 1240). The software module validation component 175 selects one or more predefined patterns of expected behavior from the software module (block 1250) and compares the identified one or more execution behavior patterns with the selected one or more predefined patterns of expected behavior (block 1260). If the software module validation component 175 determines the patterns substantially match one another, the software module validation component 175 could determine that the software module is operating as intended. For example, the software module validation component 175 could calculate a statistical measure of difference between the identified and predefined patterns of behavior and could compare the calculated measure of difference with a predefined threshold measure of difference. If the calculated measure of difference is less than the predefined threshold, the software module validation component 175 could determine that the patterns substantially match one another. Otherwise, the software module validation component 175 could determine that the patterns do not match. In the depicted example, the software module validation component 175 determines that the patterns do not substantially match and generates and transmits a notification indicating that the software module is not operating as intended (block 1270), and the method 1200 ends.

Figure 11:
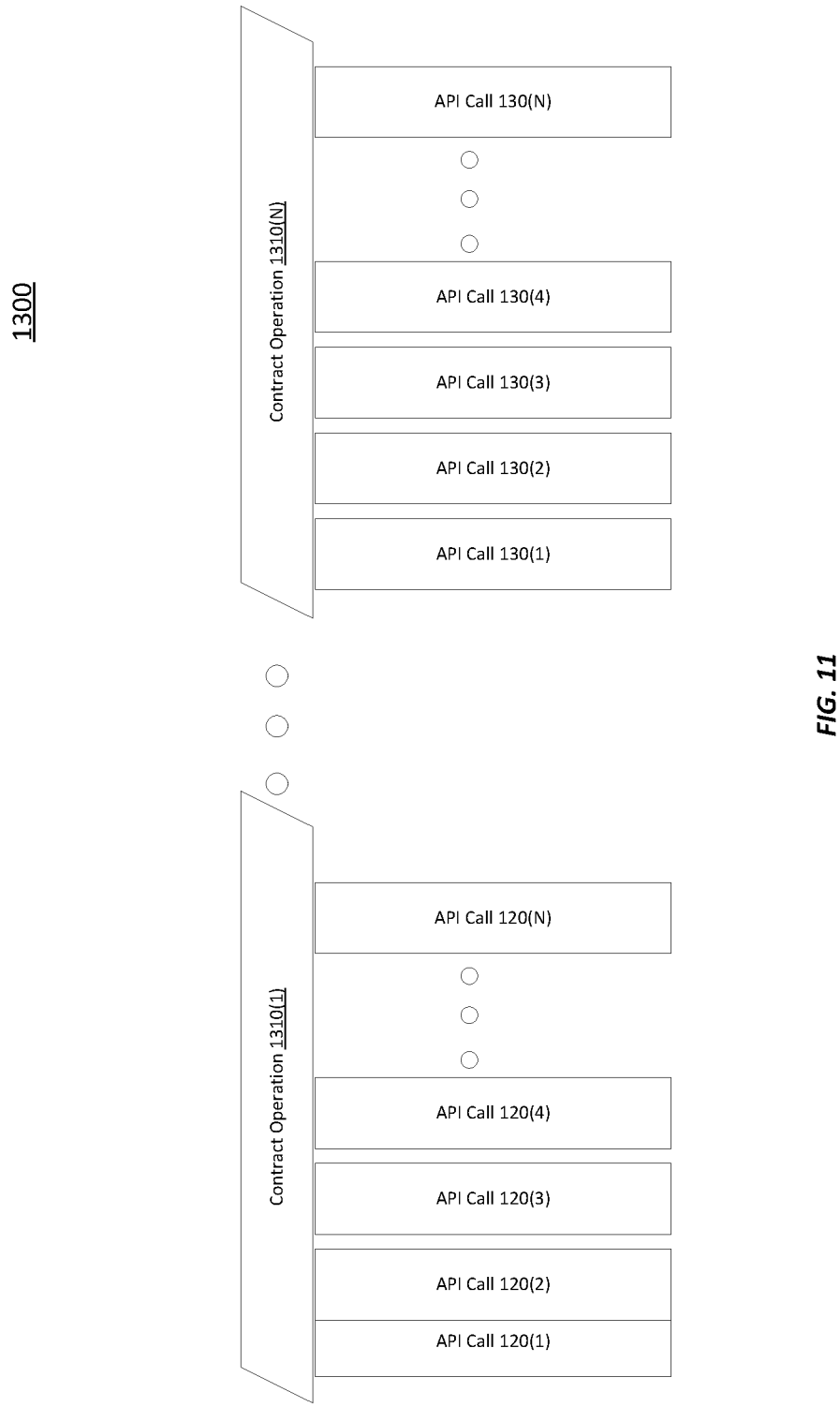
FIG. 11 illustrates a sequence of baseline tests against a cloud service contract, according to one embodiment described herein.

FIG. 11 illustrates a sequence of baseline tests against a cloud service contract, according to one embodiment described herein. As shown, the diagram 1300 illustrates a sequence of contract operations 1310(1)-(N). Generally, each of the contract operations 1310(1)-(N) represents a higher-level operation that can be performed between a software module (e.g., an agent for a cloud computing environment) and a cloud service. As shown, each of the contract operations in the sequence of contract operations 1310(1)-(N) is made up of a respective set of cloud service API calls, with the contract operation 1310(1) encompassing cloud service API calls 120(1)-(N) and the contract operation 1310(N) encompassing cloud service API calls 130(1)-(N). Of note, while the individual API calls and the parameters used in the API calls can differ across cloud services for various cloud computing environments, the contract operations 1310(1)-(N) will generally remain the same across the various cloud-specific implementations of a given service. As such, by performing a multi-part verification operation against the higher-level contract operations, embodiments can verify the performance of a software module across a plurality of different cloud computing environments (which may, e.g., each have different API calls that make-up a given higher-level contract operation).

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of dynamically configuring a device for a cloud-based environment, comprising:

receiving a configuration request for the device;

processing the configuration request to determine one or more customization characteristics;

configuring the device with the one or more customization characteristics to dynamically update the device;

determining a software module from a repository for the device based on the one or more customization characteristics;

installing the software module on the device; and performing a multi-part verification operation on the device, wherein the multi-part verification operation includes at least a multi-cloud verification operation and a runtime behavior analysis.

2. The method of claim 1, wherein the multi-cloud verification operation further comprises executing a plurality of tests of a predefined Application Program Interface (API) that is implemented by a plurality of cloud services in a plurality of cloud computing environments, and wherein a first test in the plurality of tests comprises a sequence of API calls to the API and an expected result of the sequence of API calls.

3. The method of claim 2, wherein the runtime behavior analysis comprises collecting runtime data during the execution of the plurality of tests and performing a pattern-based analysis on the collected runtime data against an expected pattern of behavior, and wherein the plurality of tests and the expected pattern of behavior were created by executing the software module on a test device against a cloud service in a test environment and capturing the behavior of the software module executing on the test device.

4. The method of claim 1, wherein the software module further comprises firmware for the device.

5. The method of claim 1, wherein performing the multi-part verification operation on the device further comprises:
executing the software module on the device;
during the execution of the software module, collecting data for a plurality of predefined data values over a window of time;
analyzing the collected data to identify one or more execution behavior patterns for the software module;
comparing the identified one or more execution behavior patterns with one or more predefined patterns of expected behavior for the software module; and
upon determining that the identified one or more execution behavior patterns do not correspond with the one or more predefined patterns of expected behavior for the software module, generating and transmitting a notification.

6. The method of claim 1, further comprising:
collecting two or more data values for two or more attributes of the device; and
processing the two or more data values as inputs to a machine learning classifier to determine a predicted device type of the device,
wherein determining the software module from the repository is further based on the predicted device type of the device.

7. The method of claim 1, wherein the one or more customization characteristics includes a device identifier.

8. The method of claim 1, wherein the one or more customization characteristics includes a device functionality.

9. A system, comprising:
one or more computer processors; and
a memory containing computer program code that, when executed by the one or more computer processors, performs an operation for performing a multi-part verification operation on a device, the operation for performing the multi-part verification operation on the device comprising:
configuring the device with one or more customization characteristics to dynamically update the device;
selecting and installing a software module on the device, based on the one or more customization characteristics;
executing a set of baseline tests against the software module on the device; during execution of the software module on the device within a first cloud computing environment, collecting data for a plurality of predefined data metrics over a window of time;
analyzing the collected data to identify one or more execution behavior patterns for the software module;
comparing the identified one or more execution behavior patterns with one or more predefined patterns of expected behavior for the software module; and
upon determining that the identified one or more execution behavior patterns do not correspond to the one or more predefined patterns of expected behavior for the software module, generating and transmitting a notification,
wherein one or more tests in the set of baseline tests is adapted to verify the device will operate in a predefined manner in each of a plurality of cloud services.

10. The system of claim 9, wherein the baseline tests comprise a plurality of tests of a predefined contract that is implemented by the plurality of cloud services in a plurality of cloud computing environments, wherein the predefined contract comprises a plurality of contract operations, and wherein each contract operation in the plurality of contract operations comprises a respective plurality of Application Program Interface (API) calls to an API provided by a cloud service.

11. The system of claim 10, wherein one or more tests in the plurality of tests are adapted to verify the device will operate in a predefined manner in each of the plurality of cloud services.

12. The system of claim 10, wherein the software module further comprises firmware for the device.

13. The system of claim 10, wherein the operation for performing the multi-part verification operation on the device further comprises:
selecting the one or more predefined patterns of expected behavior, from a plurality of predefined patterns of behavior, based on the first cloud computing environment in which the software module is executing on the device.

14. The system of claim 10, wherein the one or more customization characteristics includes a device identifier.

15. The system of claim 10, wherein the one or more customization characteristics includes a device functionality.

16. A non-transitory computer-readable medium containing computer program code that, when executed by operation of one or more computer processors, performs an operation comprising:
configuring a device with one or more customization characteristics and installing a software module on the device, based on the one or more customization characteristics;
verifying operation of the installed software module, comprising:
executing a set of baseline tests using the software module on the device;
during execution of the set of baseline tests, collecting data for a plurality of predefined data values over a window of time;
analyzing the collected data to identify one or more execution behavior patterns for the software module;
selecting one or more predefined patterns of expected behavior for the software module;
comparing the identified one or more execution behavior patterns with the selected one or more predefined patterns of expected behavior for the software module; and
upon determining that the identified one or more execution behavior patterns do not correspond with the one or more predefined patterns of expected behavior for the software module, generating and transmitting a notification,
wherein one or more tests in the set of baseline tests is adapted to verify the device will operate in a predefined manner in each of a plurality of cloud services.

17. The non-transitory computer-readable medium of claim 16, wherein the software module further comprises firmware for the device.

18. The non-transitory computer-readable medium of claim 16, wherein the one or more customization characteristics includes a device identifier.

19. The non-transitory computer-readable medium of claim 16, wherein the one or more customization characteristics includes a device functionality.

* * * * *